(12) United States Patent
Nakamura et al.

(10) Patent No.: US 10,002,501 B2
(45) Date of Patent: Jun. 19, 2018

(54) ELECTRONIC DEVICE (75) Inventors: Masatsugu Nakamura, Yokohama (JP); Yasuhiro Ueno, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 280 days.

(21) Appl. No.: 13/996,434

(22) PCT Filed: Dec. 22, 2011

(86) PCT No.: PCT/JP2011/007221
§ 371 (c)(1),
(2), (4) Date: Jun. 20, 2013

(87) PCT Pub. No.: WO2012/086208
PCT Pub. Date: Jun. 28, 2012

(65) Prior Publication Data
US 2013/0278536 A1 Oct. 24, 2013

(30) Foreign Application Priority Data
Dec. 22, 2010 (JP) .................. 2010-286509

(51) Int. Cl.
*G06F 3/01* (2006.01)
*G08B 6/00* (2006.01)
*G06F 3/041* (2006.01)
*G06F 3/0488* (2013.01)

(52) U.S. Cl.
CPC .............. *G08B 6/00* (2013.01); *G06F 3/016* (2013.01); *G06F 3/0416* (2013.01); *G06F 3/0488* (2013.01)

(58) Field of Classification Search
CPC ..................................... G06F 3/027
USPC ........................................... 345/173
See application file for complete search history.

(56) References Cited

U.S. PATENT DOCUMENTS

| 7,663,604 | B2 | 2/2010 | Maruyama et al. | |
| 9,021,379 | B1* | 4/2015 | Patel .................. | G06F 3/0416 |
| | | | | 345/168 |
| 2008/0133648 | A1* | 6/2008 | Grant et al. .......... | 709/203 |
| 2009/0325645 | A1* | 12/2009 | Bang et al. .......... | 455/566 |

(Continued)

FOREIGN PATENT DOCUMENTS

| JP | 2004-094389 A | 3/2004 |
| JP | 2007-264284 A | 10/2007 |
| JP | 2008-046844 A | 2/2008 |

OTHER PUBLICATIONS

International Search Report; PCT/JP2011/007221; dated Apr. 3, 2012.

(Continued)

*Primary Examiner* — Nelson Rosario
*Assistant Examiner* — Scott Au
(74) *Attorney, Agent, or Firm* — Studebaker & Brackett PC (57) ABSTRACT An electronic device includes a display unit 13, a panel 11, a tactile sensation providing unit 12 configured to vibrate a touch face of the panel 11, and a control unit 16 configured, when detecting contact to a tactile sensation providing area of the touch face corresponding to a predetermined word displayed on the display unit 13, to drive the tactile sensation providing unit 12 based on tactile sensation providing information associated with the predetermined word, such that a tactile sensation is provided to a contact object in contact with the tactile sensation providing area.

14 Claims, 4 Drawing Sheets (56) References Cited

U.S. PATENT DOCUMENTS

| 2010/0039393 A1* | 2/2010 | Pratt | G06F 3/0236 |
| | | | 345/173 |
| 2010/0131900 A1* | 5/2010 | Spetalnick | G06F 17/276 |
| | | | 715/825 |
| 2011/0050576 A1* | 3/2011 | Forutanpour | G06F 3/0488 |
| | | | 345/168 |
| 2012/0139844 A1* | 6/2012 | Ramstein | G06F 3/016 |
| | | | 345/173 |

OTHER PUBLICATIONS

An Office Action; "Notice of Reason for Rejection," issued by the Japanese Patent office dated Feb. 4, 2014, which corresponds to Japanese Patent Application No. 2012-549646 and is related to U.S. Appl. No. 13/996,434; with English language concise explanation.

* cited by examiner

ELECTRONIC DEVICE

CROSS REFERENCE TO RELATED APPLICATION

This application claims priority to and the benefit of Japanese Patent Application No. 2010-286509 filed on Dec. 22, 2010, the entire contents of which are incorporated herein by reference.

TECHNICAL FIELD

The present invention relates to an electronic device.

BACKGROUND

There is known a conventional electronic device that, for example, upon input of a sentence of news, a novel, a story and the like, automatically attaches emotional information to each word of the sentence and, based on the emotional information, reads out the sentence with expressions of emotions such as by adding intonation and the like (for example, see Patent Document 1).

CITATION LIST

Patent Document 1: Japanese Patent Laid-Open No. 2007-264284

SUMMARY

However, when a sentence "It was very painful." is input, an impression and an idea obtained from the word "very" varies between people. As such, it has recently been desired, as well as to read out the input sentence, to display the input sentence on a display unit of the electronic device and present a desired word in the displayed input sentence to a user in a manner different from a visual manner and an auditory manner.

Taking the above into consideration, the present invention provides an electronic device capable of presenting the desired word in the sentence displayed on the display unit in a manner other than the visual manner and the auditory manner.

Solution to Problem

In order to achieve the above matter, an electronic device according to a first aspect of the present invention includes: a display unit; a panel; a tactile sensation providing unit configured to vibrate a touch face of the panel; and a control unit configured, when detecting contact to a tactile sensation providing area of the touch face corresponding to a predetermined word displayed on the display unit, to drive the tactile sensation providing unit based on tactile sensation providing information associated with the predetermined word, such that a tactile sensation is provided to a contact object in contact with the tactile sensation providing area.

A second aspect of the present invention is the electronic device, such that the control unit displays a plurality of objects respectively corresponding to a plurality of different tactile sensation providing information on the display unit, associates one of the objects with the predetermined word and then, when detecting contact to the touch face corresponding to the predetermined word, drives the tactile sensation providing unit based on the tactile sensation providing information corresponding to the one of the objects.

A third aspect of the present invention is the electronic device, such that the control unit, when detecting contact to a contact area of the touch face corresponding to one of the plurality of objects, drives the tactile sensation providing unit based on the tactile sensation providing information corresponding to the one of the objects and, when detecting a movement of the one of the objects to a tactile sensation providing area of the predetermined word, associates the one of the objects with the predetermined word.

A fourth aspect of the present invention is the electronic, such that the control unit simultaneously displays a plurality of conversion candidates of the same text associated with different tactile sensation providing information as replacement candidates for a word to be converted displayed on the display unit and, when detecting contact to a contact area of the touch face corresponding to one of the plurality of the conversion candidates of the same text, drives the tactile sensation providing unit based on the tactile sensation providing information corresponding to the one of the conversion candidates of the same text, converts the word to be converted into the one of the conversion candidates of the same text and displays the predetermined word associated with the tactile sensation providing information.

A fifth aspect of the present invention is the electronic device including: a pressure detection unit configured to detect pressure on the touch face, such that the control unit, when data output by the pressure detection unit based on pressure of contact to the contact area of the touch face corresponding to the one of the conversion candidates satisfies a first threshold, drives the tactile sensation providing unit based on the tactile sensation providing information associated with the one of the conversion candidates and then, when the data output by the pressure detection unit satisfies a second threshold higher than the first threshold, converts the word to be converted into the one of the conversion candidates and displays the predetermined word associated with the tactile sensation providing information.

A sixth aspect of the present invention is the electronic device, further including: a communication unit capable of wirelessly connecting to a radio communication network, such that the control unit transmits information about the word displayed on the display unit, together with the tactile sensation providing information associated with the predetermined word included in the information about the word, from the communication unit to the radio communication network.

The present invention may enable the desired word in the sentence displayed on the display unit to be presented in a tactile manner.

DESCRIPTION OF EMBODIMENT

An embodiment of the present invention will be described with reference to the accompanying drawings. In the present specification, a "word" is regarded as synonymous with a "symbol" and means characters in a broad sense including, as well as JIS (Japanese Industrial Standards) characters, a pictogram, a face mark and the like.

Figure 1:
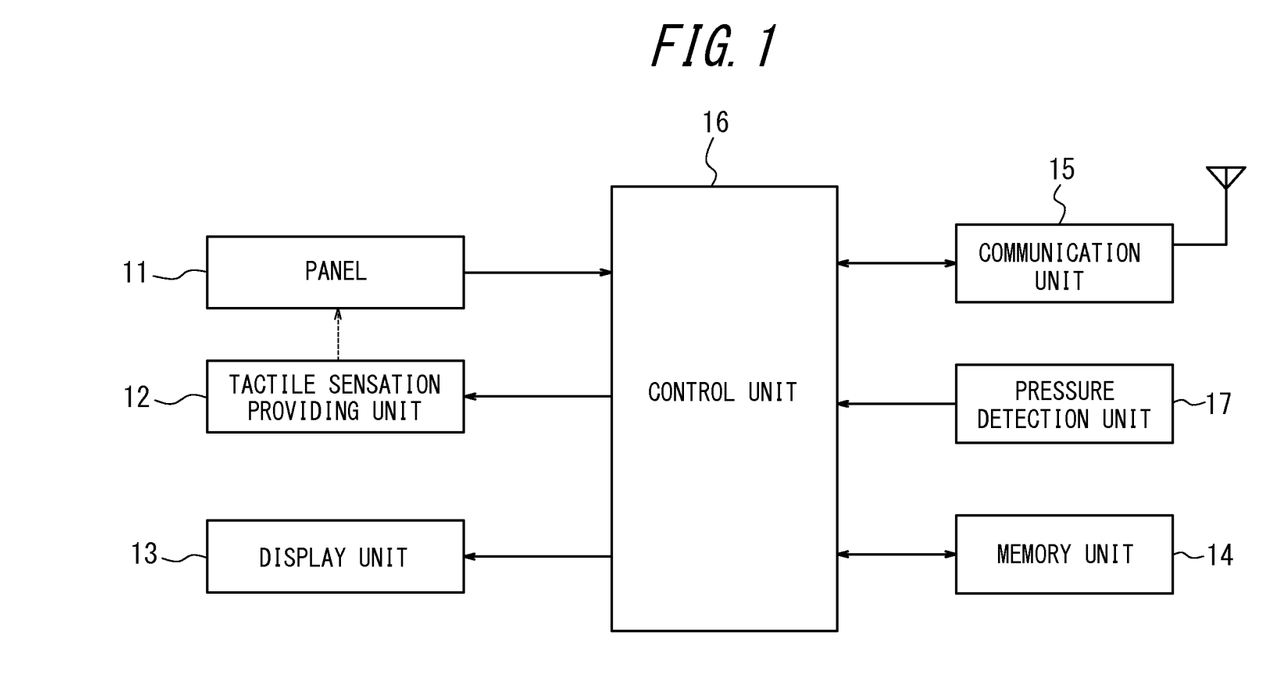
FIG. 1 is a functional block diagram illustrating a schematic configuration of a main section of an electronic device according to one embodiment of the present invention.

FIG. 1 is a functional block diagram illustrating a schematic configuration of a main section of an electronic device according to one embodiment of the present invention. The electronic device illustrated in FIG. 1 constitutes a mobile phone, for example, and includes a panel 11, a tactile sensation providing unit 12, a display unit 13, a memory unit 14, a communication unit 15, a control unit 16 and a pressure detection unit 17.

The panel 11 detects contact to a touch face thereof by a contact object such as a finger and a stylus pen and may be a known panel of such as a resistive film type, a capacitive type, an optical type and the like for outputting two-dimensional position information of a touch position (a contact position of the contact object). The panel 11 is disposed on the display unit 13. The position information from the panel 11 is supplied to the control unit 16.

The tactile sensation providing unit 12 is constituted by using, for example, a piezoelectric element. The piezoelectric element is attached to a rear face of the panel 11 (a face opposite to the touch face) and, upon application of a driving voltage under control of the control unit 16, vibrates the touch face of the panel 11 as a converse piezoelectric effect. Also, the piezoelectric element, as a direct piezoelectric effect, generates a voltage based on pressure (outputs data). Thereby, the control unit 16 may detect pressure load on the touch face of the panel 11. The piezoelectric element may have a known configuration such as monomorph, unimorph, bimorph and the like based on a size of the panel 11, vibration amplitude and the like. The pressure detection unit 17 is constituted by using a strain gauge, the piezoelectric element or the like. The following description is made on the assumption that the pressure detection unit 17 shares the piezoelectric element of the tactile sensation providing unit 12.

The display unit 13 displays a keyboard, input words, conversion candidates of the input words, and objects such as icons and the like and is constituted by using, for example, a liquid crystal display panel, an organic EL display panel or the like. Contact to the object displayed on the display unit 13, that is, contact to a tactile sensation providing area of the touch face of the panel 11 corresponding to the displayed object is detected by the control unit 16 based on the position information output from the panel 11.

The memory unit 14 is constituted by using, for example, a volatile memory or a non-volatile memory. The memory unit 14 stores, as well as various application programs to be executed by the electronic device, tactile sensation providing information for providing various tactile sensations to the contact object such as the finger or the like by driving the tactile sensation providing unit 12.

When the tactile sensation providing unit 12 is constituted by using the piezoelectric element, for example, in order to provide soft tactile sensations such as, for example, a "throbbing" sensation and a "jelly-like" sensation to an operator, tactile sensation providing information about a signal of a triangle wave or a sine wave at a frequency of approximately 200 Hz to 500 Hz for two or three cycles is stored. Also, in order to provide a hard tactile sensation such as a "plock" sensation to the operator, tactile sensation providing information about a signal of a square wave at a frequency of approximately 200 Hz to 500 Hz for two or three cycles is stored. Further, in order to provide a click sensation such as a "ticking" sensation similar to that obtained when pressing a push-button switch to the operator, tactile sensation providing information about a signal of a sine wave at a frequency of approximately 100 Hz to 200 Hz for one cycle is stored. Here, the "throbbing" sensation, the "jelly-like" sensation, the "plock" sensation and the "ticking" sensation described in the present specification are sensations expressed in Japanese obtained by the operator, and examples of drive signals to provide actual tactile sensations are set forth above. Also, the tactile sensation providing information is a mere example and tactile sensation providing information including various vibration amplitude and vibration patterns is stored.

Further, the memory unit 14 stores a plurality of different tactile sensation providing information associated with one conversion candidate of a predetermined word. For example, tactile sensation providing information about different vibration amplitude and vibration patterns for ranking one conversion candidate describing a feeling such as "fun" or a sensation such as "aches" in terms of "large", "medium" and "small" is stored. Note that the memory unit 14 may be constituted by using an internal memory of the control unit 16.

The communication unit 15 wirelessly connects to a radio communication network and performs a communication such as a telephone call, email, the internet and the like.

The control unit 16 is constituted by using, for example, a CPU or the like and controls overall operations according to the application programs stored in the memory unit 14. The control unit 16, when providing the tactile sensation to the contact object in contact with the panel 11, detects contact to the tactile sensation providing area corresponding to the predetermined word displayed on the display unit 13 based on the position information from the panel 11. Then, the control unit 16 drives the tactile sensation providing unit 12 based on the tactile sensation providing information associated with the predetermined word stored in the memory unit 14.

Figure 2A:
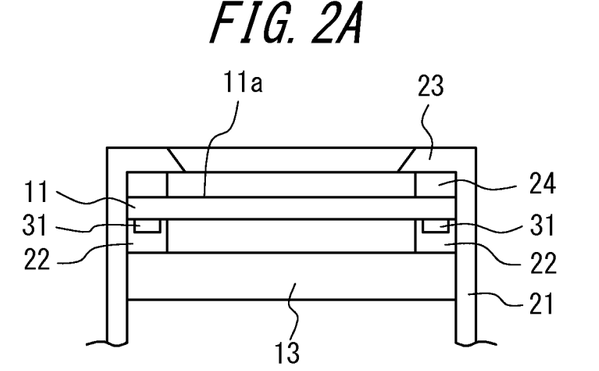
FIGS. 2A and B are schematic views illustrating parts of a housing structure of the electronic device illustrated in FIG. 1.
Figure 2B:
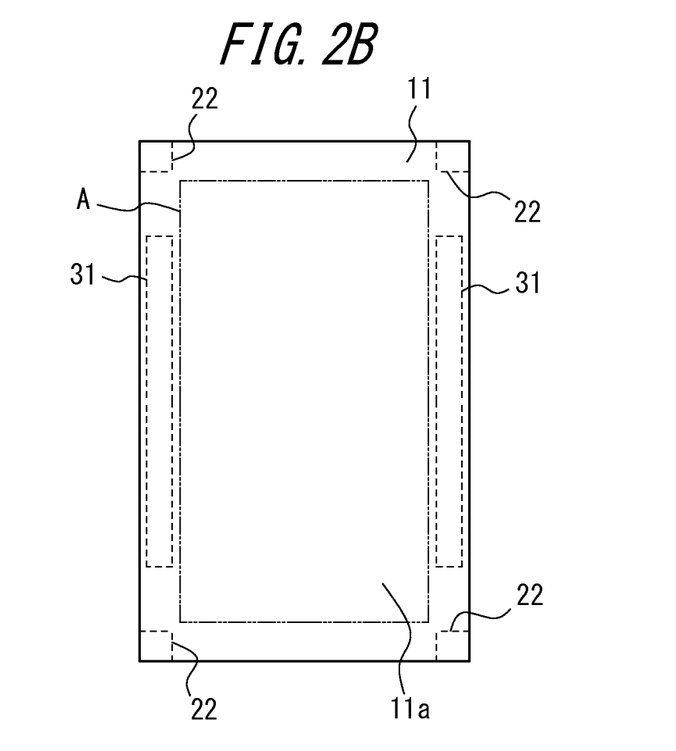

FIG. 2 illustrates an example of a housing structure of the touch sensor 11, the piezoelectric element 12 and the display unit 13 illustrated in FIG. 1; FIG. 2A is a cross-sectional view of a main section, and FIG. 2B is a plane view of the main section. The display unit 13 is contained and held in a housing 21. The panel 11 is disposed on the display unit 13 via insulators 22 made of elastic members. The panel 11 is held on the display unit 13 via the insulators 22 arranged at four corners outside a display area A of the display unit 13 indicated by chain double-dashed lines in FIG. 2B.

The housing 21 is provided with an upper cover 23 covering a surface area of the panel 11 outside the display area A of the display unit 13. An insulator 24 made of elastic member for dust-proof is arranged between the upper cover 23 and the panel 11.

The panel 11 has, for example, a surface member having a touch face 11a and constituted by using a transparent film or the glass and a rear face member made of glass or acryl. The panel 11 is designed such that, when the touch face 11a is pressed down via the insulator 24, a pushed part is slightly bent (strained) in accordance with a pressing force and the entire panel 11 including the rear face member is slightly bent.

In an example in the figure, the tactile sensation providing unit 12 includes two piezoelectric elements 31. The piezoelectric elements 31 are attached near two opposing sides, respectively, covered by the upper cover 23 on the rear face of the panel 11 for displacing the panel 11 in a curved manner. Preferably, the piezoelectric elements 31 are attached to the panel 11 such that a bending direction of the panel 11 when pressed down and a curving direction of the piezoelectric elements 31 match each other. In FIG. 2, since the panel 11 is rectangular in shape in a planar view, the two piezoelectric elements 31 are attached along two long opposing sides at positions close thereto. Note that the housing 21, the upper cover 23 and the insulator 24 illustrated in FIG. 2A are omitted in FIG. 2B.

The following is a description of an operation example of the electronic device according to the present embodiment, with reference to FIG. 1 and FIG. 2.

First Operation Example

Figure 3:
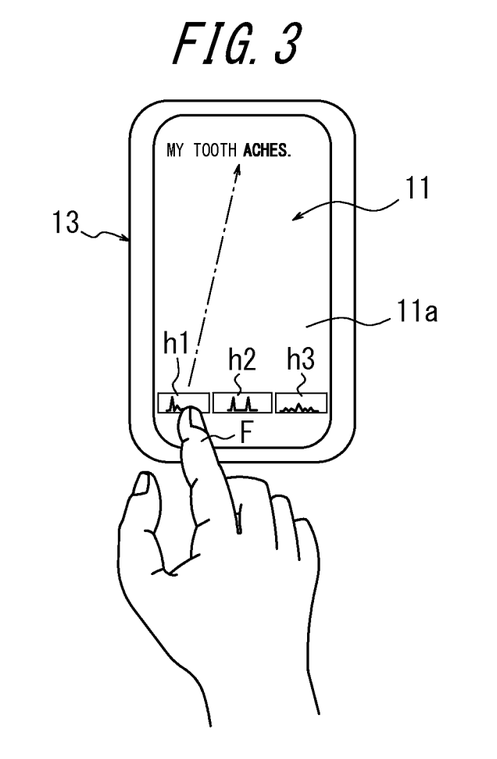
FIG. 3 is a diagram illustrating a display example of a display unit in a first operation example by the electronic device illustrated in FIG. 1.

FIG. 3 is a diagram illustrating a display example of the display unit 13 according to a first operation example. In this operation example, in a text creation mode, the control unit 16 graphically depicts each of a plurality of different tactile sensation providing information stored in the memory unit 14 into objects and displays the objects in a predetermined area of the display unit 13. FIG. 3 illustrates an example in which three objects h1, h2 and h3 are displayed in a lower area of the display unit 13. When the control unit 16 detects contact to the contact area of the touch face 11a corresponding to one of the objects displayed on the display unit 13 based on the output of the panel 11, the control unit 16 drives the tactile sensation providing unit 12 based on the tactile sensation providing information corresponding to the one of the objects. Thereby, the tactile sensation is provided to a contact object F such as the finger or the like in contact with the contact area of the one of the objects.

Then, when the control unit 16, based on the output of the panel 11, detects a movement of the one of the objects by a drag and drop operation to a predetermined tactile sensation providing area including a display area of a conversion confirmed word (a predetermined word), which is confirmed to be converted, the control unit 16 associates the tactile sensation providing information corresponding to the one of the objects with the conversion confirmed word and stores the tactile sensation providing information in the memory unit 14. FIG. 3 illustrates an example in which the object h1 is dragged and dropped in the tactile sensation providing area corresponding to the display area of the conversion confirmed word "aches" in a text "My tooth aches.", whose input is confirmed, such that the "aches" is associated with a level (feeling) thereof.

According to the first operation example, as described above, the control unit 16 displays a plurality of objects corresponding to a plurality of different tactile sensation providing information on the display unit 13. Then, when detecting contact to the contact area of the touch face 11a corresponding to one of the objects, the control unit 16 drives the tactile sensation providing unit 12 based on the tactile sensation providing information corresponding to the one of the objects. Also, when detecting a movement (the drag and drop operation) of the one of the objects to the tactile sensation providing area of one conversion confirmed word displayed on the display unit 13, the control unit 16 associates the tactile sensation providing information corresponding to the one of the objects with the one conversion confirmed word.

Figure 4:
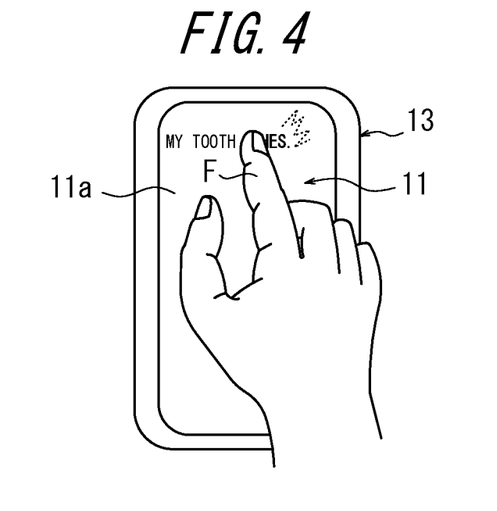
FIG. 4 is a diagram illustrating a tactile sensation providing state of the display example in FIG. 3.

Accordingly, a user may easily associate a desired convention confirmed word with a tactile sensation similar to feeling at the time. Then, when the user, as illustrated in FIG. 4, contacts the touch face 11a at the conversion confirmed word "aches" in the text "My tooth aches." displayed on the display unit 13 by using the contact object F such as the finger or the like, a tactile sensation associated with the "aches" is provided.

The text created as illustrated in FIG. 3, together with the associated tactile sensation providing information, is transmitted as email to a correspondent electronic device having a configuration similar to the electronic device illustrated in FIG. 1, for example. Thereby, when a user of the correspondent electronic device, in a manner similar to FIG. 4, contacts the tactile sensation providing area of the touch face 11a at the predetermined word in the text of a displayed received email, the tactile sensation may be provided. Accordingly, a feeling expression that may have different impression between people may be transmitted to a receiver in a more straightforward and realistic manner.

Second Operation Example

Figure 5:
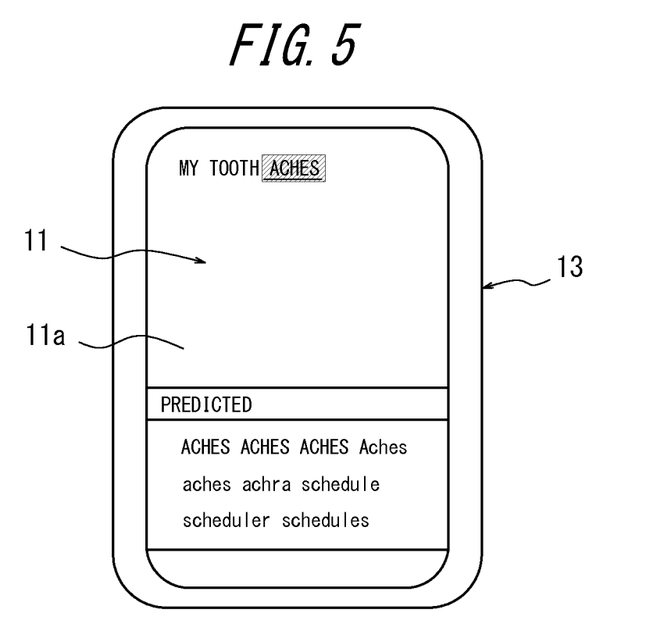
FIG. 5 is a diagram illustrating a display example of the display unit in a second operation example by the electronic device illustrated in FIG. 1.

FIG. 5 is a diagram illustrating a display example of the display unit 13 according to a second operation example. In this operation example, in the text creation mode, the conversion candidates of the word to be converted in the input text displayed on the display unit 13 is displayed in a predetermined display area of the display unit 13. When a plurality of the conversion candidates of the same text for a word associated with different tactile sensation providing information are stored in the memory unit 14, the plurality of the conversion candidates of the same text are displayed at a time. FIG. 5 illustrates an example in which, for the word to be converted "aches", a number of conversion candidates including the three candidates having the same text "ACHES" respectively associated with different tactile sensation providing information are displayed at a time.

When the control unit 16 detects contact to the contact area of the touch face 11a corresponding to one conversion candidate based on the output of the panel 11, the control unit 16 determines selection of the one conversion candidate and confirms an input word by converting the word to be converted into the determined conversion candidate. Thereby, when the tactile sensation providing information is associated with the conversion candidate, the tactile sensation providing information is simultaneously associated with the conversion confirmed word. In this case, also, at a point when the control unit 16 detects the contact to a corresponding contact area of the touch face 11a, the control unit 16 drives the tactile sensation providing unit 12 based on the tactile sensation providing information associated with the conversion candidate. Thereby, the tactile sensation is provided to the contact object such as the finger or the like in contact with the contact area of the conversion candidate.

According to the second operation example, as described above, at confirmation of conversion of the word to be converted, when there are a plurality of conversion candidates of the same text respectively associated with different tactile sensation providing information, the plurality of the conversion candidates of the same text are displayed on the display unit 13 at a time. Then, when detecting the contact to the contact area of the touch face 11a corresponding to one of the conversion candidates, the control unit 16 drives the tactile sensation providing unit 12 based on the tactile sensation providing information corresponding to the one of the conversion candidates and confirms the conversion of the word to be converted into the one of the conversion candidates.

In the second operation example, accordingly, desired tactile sensation providing information may be associated simultaneously with a conversion operation of the input word. Comparing to the first operation example, therefore, the trouble of associating the desired tactile sensation providing information is saved and thus a faster input operation is enabled. Other function effects are similar to those of the first operation example.

Third Operation Example

According to a third operation example, in the text creation mode, the piezoelectric elements 31 output a voltage (data) based on the pressure on the touch face 11a of the panel 11 to the control unit 16. The control unit 16 displays the conversion candidate of the word to be converted in the input text displayed on the display unit 13 in the predetermined display area of the display unit 13. Similarly to the second operation example, when a plurality of conversion candidates of the same text associated with different tactile sensation providing information are stored in the memory unit 14, the plurality of the conversion candidates of the same text are displayed at a time.

Then, the control unit 16 detects contact to the contact area of the touch face 11a corresponding to one conversion candidate based on the output of the panel 11 and inputs the data output by the piezoelectric elements 31. As a result, based on the pressure at a position on the touch face 11a corresponding to the one conversion candidate to which the contact is detected, when the control unit 16 detects that the data (a value of the voltage) output by the piezoelectric elements 31 satisfies a first threshold, the control unit 16 drives the piezoelectric elements 31 based on the tactile sensation providing information associated with the one conversion candidate. Thereby, the one conversion candidate is selected and the tactile sensation is provided to the contact object such as the finger or the like in contact with the contact area of the one conversion candidate. On the other hand, when the one conversion candidate to which the contact is detected is not associated with the tactile sensation providing information, the control unit 16 selects the conversion candidate corresponding to the contact area where the data satisfies the first threshold and refrains from driving the piezoelectric elements 31.

Then, when detecting that the data output by the piezoelectric elements 31 satisfies a second threshold higher than the first threshold, the control unit 16 selects the one conversion candidate and confirms conversion of the word to be converted into the selected conversion candidate. Thereby, when the tactile sensation providing information is associated with the conversion candidate, the tactile sensation providing information is simultaneously associated with the conversion confirmed word.

According to the third operation example, as described above, the piezoelectric elements 31 output the voltage (data) to the control unit 16 based on the pressure on the touch face 11a of the panel 11. Then, when the data associated with the contact area corresponding to one conversion candidate satisfies the first threshold, the conversion candidate is selected and, when the conversion candidate is associated with the tactile sensation providing information, the tactile sensation providing unit 12 (piezoelectric elements 31) is driven based on the tactile sensation providing information such that the tactile sensation is provided to the contact object. Then, when the data satisfies the second threshold, selection of the one conversion candidate is determined and conversion of the word to be converted into the conversion candidate is confirmed.

According to the third operation example, therefore, based on the pressure associated with the contact to the contact area corresponding to the conversion candidate (pressure associated with the contact on the touch face 11a), when the value of the voltage (values of the data) output by the piezoelectric elements 31 is detected to satisfies the second threshold higher than the first threshold, the predetermined tactile sensation providing information may be associated simultaneously with the confirmation of the conversion of the input word. Comparing to the second operation example, accordingly, a more secured input operation is enabled. Other function effects are similar to those of the second operation example. Note that, according to the present operation example, when the conversion candidate is not associated with the tactile sensation providing information, the conversion candidate is selected when the first threshold is satisfied. However, the conversion candidate may be selected when the second threshold is satisfied.

It is to be understood that the present invention is not limited to the above embodiment but may be modified or varied in a multiple manner. For example, the tactile sensation providing unit 12, instead of having a configuration to directly vibrate the panel 11 by using the piezoelectric elements, may be configured to indirectly vibrate the panel 11 by using an eccentric motor or the like. Also, in order to detect the pressure on the touch face 11a of the panel 11 as described in the third operation example, a piezoelectric element or a strain sensor exclusively for detection of the pressure may be attached to the panel 11.

Further, the corresponding tactile sensation providing information about feeling and the like may be associated with a predetermined word in subtitles of a movie and the like. This enables, by contacting the subtitles when watching the movie on the electronic device according to the present invention, to provide the tactile sensation in the tactile sensation providing area of the touch face corresponding to the predetermined word, which enhances a realistic sensation.

Figure 6:
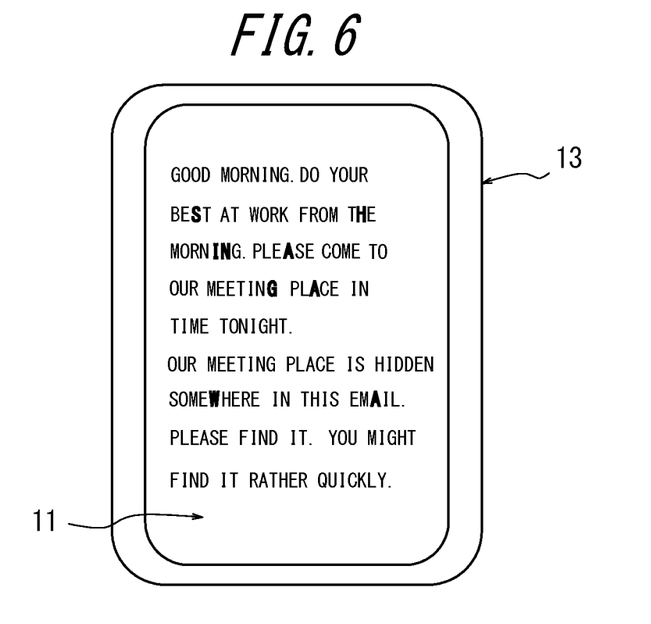
FIG. 6 is diagram illustrating a variation of the tactile sensation providing state of the electronic device illustrated in FIG. 1.

The words for providing the tactile sensation are not limited to the words for expressing feeling and the like but may be any words. For example, the tactile sensation providing information may be associated with any word in a text of advertising email delivered to the electronic device. Thereby, an advertising method such as providing the user who has found a tactile sensation providing word with a gift is enabled. Or, as illustrated in FIG. 6, for example, the tactile sensation providing information may be associated with any character in email such that cryptography is embedded in the email and the tactile sensation providing characters mean another word or text. In a case in FIG. 6, each of bold characters "S", "H", "I", "N", "A", "G", "A", "W" and "A" ("SHINAGAWA") (the same font as others are actually used) are associated with the tactile sensation providing information.

The display unit 13 and the panel 11 in the embodiment set forth above may be constituted by using an integrated device, such as by sharing a substrate having functions of them and the like. Such an integrated device having both functions of the display unit 13 and the panel 11 may have a configuration in which, for example, a plurality of photoelectric conversion elements such as photodiodes are orderly mixed in a group of pixel electrodes arranged in a matrix pattern in a liquid crystal panel. This integrated device may display an image in a structure of the liquid crystal panel and also detect a touch position by nearby photoelectric conversion elements that receive backlight of the liquid crystal display reflected by a tip of a pen in contact with a desired position on the face of the panel.

The term "contact" according to the present invention is not limited to a physical contact, especially when the optical panel is employed, as a position where infrared rays on the panel is blocked by the finger or the stylus pen is detected.

Further, according to the third operation example described above, corresponding operations are executed when the data (voltage) satisfies the predetermined thresholds such as the first threshold and the second threshold. Here, "when the data satisfies the predetermined thresholds" may include "when the data reach a predetermined value", "when the data exceed the predetermined value", or "when the predetermined value is detected".

REFERENCE SIGNS LIST 11 panel
11a touch face
12 tactile sensation providing unit
13 display unit
14 memory unit
15 communication unit
16 control unit
17 pressure detection unit
31 piezoelectric element

The invention claimed is:

1. An electronic device comprising:
a display;
a panel;
a tactile sensation provider configured to vibrate a touch face of the panel; and
a controller configured to display a plurality of objects respectively corresponding to a plurality of different vibratory tactile sensation providing information on the display; to associate, based on a user input, one of the objects corresponding to one of the plurality of different vibratory tactile sensation providing information with a predetermined word displayed on the display; and, when detecting contact to a tactile sensation providing area of the touch face corresponding to the predetermined word displayed on the display, to drive the tactile sensation provider based on the vibratory tactile sensation providing information correspondingly associated to the one of the objects such that a tactile sensation is provided to a contact object in contact with the tactile sensation providing area,
wherein the controller displays a plurality of conversion candidates of the same text associated with different tactile sensation providing information as replacement candidates for a word to be converted displayed on the display and, when detecting contact to a contact area of the touch face corresponding to one of the plurality of the conversion candidates of the same text, drives the tactile sensation provider based on the tactile sensation providing information corresponding to the one of the conversion candidates of the same text, converts the word to be converted into the one of the conversion candidates of the same text and displays the predetermined word associated with the tactile sensation providing information.

2. The electronic device according to claim 1, wherein the controller, when detecting contact to a contact area of the touch face corresponding to one of the plurality of objects, drives the tactile sensation provider based on the tactile sensation providing information corresponding to the one of the objects and, when detecting a movement of the one of the objects to a tactile sensation providing area of the predetermined word, associates the one of the objects with the predetermined word.

3. The electronic device according to claim 2, further comprising:
a communicator capable of wirelessly connecting to a radio communication network, wherein the controller transmits information about the word displayed on the display, together with the tactile sensation providing information associated with the predetermined word included in the information about the word, from the communicator to the radio communication network.

4. The electronic device according to claim 1, further comprising:
a communicator capable of wirelessly connecting to a radio communication network, wherein the controller transmits information about the word displayed on the display, together with the tactile sensation providing information associated with the predetermined word included in the information about the word, from the communicator to the radio communication network.

5. The electronic device according to claim 1, further comprising:
a communicator capable of wirelessly connecting to a radio communication network, wherein the communicator transmits information about the word displayed on the display, together with the tactile sensation providing information associated with the predetermined word included in the information about the word, from the communicator to the radio communication network.

6. An electronic device, comprising:
a display;
a panel;
a tactile sensation provider configured to vibrate a touch face of the panel;
a controller configured, when detecting contact to a tactile sensation providing area of the touch face corresponding to a predetermined word displayed on the display, to drive the tactile sensation provider based on tactile sensation providing information associated with the predetermined word, such that a tactile sensation is provided to a contact object in contact with the tactile sensation providing area; and
a pressure detector configured to detect pressure on the touch face, wherein the controller displays a plurality of conversion candidates of the same text associated with different tactile sensation providing information as replacement candidates for a word to be converted displayed on the display and, when detecting contact to a contact area of the touch face corresponding to one of the plurality of the conversion candidates of the same text, drives the tactile sensation provider based on the tactile sensation providing information corresponding to the one of the conversion candidates of the same text, converts the word to be converted into the one of the conversion candidates of the same text associated with the different tactile sensation providing information and displays the predetermined word associated, based on a user input, with the tactile sensation providing information, and the controller, when data output by the pressure detector based on pressure of contact to the contact area of the touch face corresponding to the one of the conversion candidates satisfies a first threshold, drives the tactile sensation provider based on the tactile sensation providing information associated with the one of the conversion candidates and then, when the data output by the pressure detector satisfies a second threshold higher than the first threshold, converts the word to be converted into the one of the conversion candidates and displays the predetermined word associated with the tactile sensation providing information.

7. The electronic device according to claim 6, further comprising:
a communicator capable of wirelessly connecting to a radio communication network, wherein the controller transmits information about the word displayed on the display, together with the tactile sensation providing information associated with the predetermined word included in the information about the word, from the communicator to the radio communication network.

8. An electronic device comprising:
a display;
a panel;
a tactile sensation provider configured to vibrate a touch face of the panel; and
a controller configured to display a plurality of objects respectively corresponding to a plurality of different tactile sensation providing information on the display; to associate, based on a user input, one of the objects corresponding to one of the plurality of different tactile sensation providing information with a predetermined word displayed on the display; and, when detecting contact to a tactile sensation providing area of the touch face corresponding to the predetermined word displayed on the display, to drive the tactile sensation provider based on the tactile sensation providing information correspondingly associated to the one of the objects and such that a vibration sensation is provided to a contact object in contact with the tactile sensation providing area,
wherein the controller displays a plurality of conversion candidates of the same text associated with different tactile sensation providing information as replacement candidates for a word to be converted displayed on the display and, when detecting contact to a contact area of the touch face corresponding to one of the plurality of the conversion candidates of the same text, drives the tactile sensation provider based on the tactile sensation providing information corresponding to the one of the conversion candidates of the same text, converts the word to be converted into the one of the conversion candidates of the same text and displays the predetermined word associated with the tactile sensation providing information.

9. The electronic device according to claim 8, wherein the controller, when detecting contact to a contact area of the touch face corresponding to one of the plurality of objects, drives the tactile sensation provider based on the tactile sensation providing information corresponding to the one of the objects and, when detecting a movement of the one of the objects to a tactile sensation providing area of the predetermined word, associates the one of the objects with the predetermined word.

10. The electronic device according to claim 9, further comprising: a communicator capable of wirelessly connecting to a radio communication network, wherein the controller transmits information about the word displayed on the display, together with the tactile sensation providing information associated with the predetermined word included in the information about the word, from the communicator to the radio communication network.

11. The electronic device according to claim 8, comprising:
a pressure detector configured to detect pressure on the touch face, wherein the controller, when data output by the pressure detector based on pressure of contact to the contact area of the touch face corresponding to the one of the conversion candidates satisfies a first threshold, drives the tactile sensation provider based on the tactile sensation providing information associated with the one of the conversion candidates and then, when the data output by the pressure detector satisfies a second threshold higher than the first threshold, converts the word to be converted into the one of the conversion candidates and displays the predetermined word associated with the tactile sensation providing information.

12. The electronic device according to claim 11, further comprising:
a communicator capable of wirelessly connecting to a radio communication network, wherein the controller transmits information about the word displayed on the display, together with the tactile sensation providing information associated with the predetermined word included in the information about the word, from the communicator to the radio communication network.

13. The electronic device according to claim 8, further comprising:
a communicator capable of wirelessly connecting to a radio communication network, wherein the controller transmits information about the word displayed on the display, together with the tactile sensation providing information associated with the predetermined word included in the information about the word, from the communicator to the radio communication network.

14. The electronic device according to claim 8, further comprising:
a communicator capable of wirelessly connecting to a radio communication network, wherein the controller transmits information about the word displayed on the display, together with the tactile sensation providing information associated with the predetermined word included in the information about the word, from the communicator to the radio communication network.

\* \* \* \* \*